United States Patent [19]
Aoki et al.

[11] Patent Number: 5,604,729
[45] Date of Patent: Feb. 18, 1997

[54] ATM COMMUNICATION SYSTEM HAVING A PHYSICAL LOOP FORM WITH LOGICAL START POINT AND END POINT

[75] Inventors: Kaoru Aoki; Masataka Takano, both of Yokohama; Junichirou Yanagi, Kodaira; Tetsushi Nakano, Fujisawa; Miho Iino, Yokohama, all of Japan

[73] Assignee: Hitachi, Ltd., Tokyo, Japan

[21] Appl. No.: 314,776

[22] Filed: Sep. 29, 1994

Related U.S. Application Data

[63] Continuation-in-part of Ser. No. 566,702, Dec. 4, 1995, which is a continuation of Ser. No. 230,152, Apr. 19, 1994, Pat. No. 5,487,062.

[30] Foreign Application Priority Data

Oct. 1, 1993 [JP] Japan .................................. 5-246563

[51] Int. Cl.[6] .................................................. H04L 12/437
[52] U.S. Cl. .......................... 370/224; 370/397; 370/440; 370/520; 340/827; 340/825.05; 395/182.02
[58] Field of Search ................................ 370/60, 61, 16, 370/17, 60.1, 85.1, 85.3, 85.5, 85.9, 85.12, 85.15, 85.11, 16.1, 100.1, 85.8, 85.7, 55; 340/825.05, 825.06, 825.07, 825.54, 827; 395/181, 182.02

[56] References Cited

U.S. PATENT DOCUMENTS

| | | | |
|---|---|---|---|
| 4,922,244 | 5/1990 | Hullett et al. | 340/825.5 |
| 5,050,166 | 9/1991 | Cantoni et al. | 370/94.1 |
| 5,051,742 | 9/1991 | Hullett et al. | 340/825.5 |
| 5,150,356 | 9/1992 | Tasutsui | 370/85.12 |
| 5,285,446 | 2/1994 | Yonehara | 370/60.1 |
| 5,329,521 | 7/1994 | Walsh et al. | 370/16 |
| 5,339,317 | 8/1994 | Tanaka et al. | 370/16.1 |
| 5,467,346 | 11/1995 | Ito et al. | 370/60 |
| 5,469,428 | 11/1995 | Tokura et al. | 370/85.12 |

FOREIGN PATENT DOCUMENTS 0506396  9/1992  European Pat. Off. ............. 370/16.1

OTHER PUBLICATIONS

Prycker ATM Solution for broadband ISDN 1993.

Primary Examiner—Alpus H. Hsu
Assistant Examiner—Seema S. Rao
Attorney, Agent, or Firm—Antonelli, Terry, Stout & Kraus, LLP

[57] ABSTRACT

An ATM communication system including a plurality of communication nodes connected in a loop form by buses, buffers disposed in each communication node, a synchronizing pulse generation circuit for conducting cell demultiplexing of all communication nodes at the same timing, storage devices disposed in each communication node to store mounting position information of the communication node and slot generator position information, and a circuit used by each communication node to automatically transmit and receive cells on the basis of position information described above.

18 Claims, 14 Drawing Sheets

T : TRANSMITTING NODE MOUNTING POSITION
R : RECEIVING NODE MOUNTING POSITION
SG : SG SETTING POSITION

VPI / VCI IN : INPUT VPI / VCI
VPI / VCI OUT : OUTPUT VPI / VCI
R : MOUNTING POSITION OF RECEIVING MODE
MC : CONNECTION NUMBER

T : TRANSMITTING NODE MOUNTING POSITION
R : RECEIVING NODE MOUNTING POSITION
SG : SG SETTING POSITION

T : TRANSMITTING NODE MOUNTING POSITION
R : RECEIVING NODE MOUNTING POSITION
SG : SG SETTING POSITION
D : LOOP BACK DIRECTION ion Ser. No. 08/566,702, filed Dec. 4, 1995, which is a continuation of application Ser. No. 08/230,152, filed Apr. 19, 1994, now U.S. Pat. No. 5,487,062.

BACKGROUND OF THE INVENTION

There has been conventionally known a method for sending common synchronizing pulses to communication nodes of a communication network in which communication nodes are not connected in a loop form and for achieving operation synchronism. However, there are not yet communication networks having communication nodes connected in a loop form and adopting the above described synchronizing method.

On the other hand, in ATM communication systems in which a plurality of communication nodes sends and receives cells to and from each other, various switches such as space switches, time switches, and bus switches are used for cell switching.

As for configurations of ATM communication systems using bus switches, international standardization is being advanced. For example, there is a distributed queue dual bus (DQDB) method proposed in IEEE and described in "Distributed Queue Dual Bus Subnetwork of a Metropolitan Area Network", IEEE 802.6 (Dec. 6, 1990).

In this ATM communication system, a unidirectional bus is connected between one communication node and an adjacent communication node to transmit a cell. From the communication node which has received this cell, a unidirectional bus is connected to an adjacent communication node to transmit the cell. This ATM communication system is formed by thus connecting a plurality of communication nodes to their adjacent communication nodes with a unidirectional bus. Furthermore, this ATM communication system has a feature that it has a similar bus in the opposite direction as well. When there are, on the double buses, no cells transmitted by other communication nodes, each communication node multiplexes, on a bus, a cell inputted from an input line. In this way, each communication node transmits the cell. Furthermore, each communication node separates a cell addressed thereto from the bus. In this way, each communication node receives the cell. Data are thus transmitted and received between communication nodes at high speed.

In this ATM communication system, a cell synchronizing method described in "Introduction to B-ISDN", OHM SHA LTD., p. 120 is used as a synchronizing method for finding a cell head when demultiplexing cells.

In the ATM communication system using the distributed queue dual bus method, two buses having different communication directions form physical loops, respectively. In that case as well, logical start points and end points of logical buses are provided and traffic control is exercised in order to equalize bus use frequencies of communication nodes. That is to say, cells flowing on each bus are discarded at the end point of the bus. In other words, contents of the cells are not transmitted beyond the end point. Furthermore, each of the start point and the end point can be set in an arbitrary position on each bus and can also be altered. The logical start point of each bus, i.e., the start point of each loop is called a slot generator.

Each of two buses having different communication directions has a start point and an end point of. When a cell is to be transmitted from a certain communication node to another communication node, it is necessary to decide which of the two buses the cell to be transmitted should be multiplexed on. Conventionally, this selection of the transmission direction is made by providing a table in each communication node so as to allow the central processing unit to set a transmission direction in the table.

In this ATM communication system, cell demultiplexing processing is conducted in each node. Therefore, the cell is transmitted to an adjacent node after a delay of the processing time. In addition, a transmission delay to the adjacent node is also caused. That is to say, the phase of the head of the cell received by the adjacent node deviates from the phase of the cell in the transmitting node. In the receiving node, therefore, it is necessary to find the head of the cell having a deviated phase and conduct cell demultiplexing processing. In the receiving node, therefore, cell synchronizing is conducted by using a method of extracting a synchronizing signal from received data to find the head of the cell in each communication node as described in "Introduction to B-ISDN", OHM SHA LTD., p. 120.

That is to say, the conventional digital communication network using looped multiple buses can realize high-speed communication. For this realization, however, complicated devices and processing as heretofore described are needed.

(1) Between adjacent communication nodes, the head position of a packet is deviated by cell processing time. For bringing communication interface units into synchronism, therefore, a complicated synchronizing method is needed. In addition, if the position of a slot generator is altered, the phase of a cell after the position alteration of the slot generator varies from that before the alteration. This results in a drawback that every communication node temporarily gets out of synchronism.

(2) In order to determine the transmission direction of data, it is necessary to store relations between communication buses and transmission directions every communication node in the form of an exclusive table or in the form of integration with other tables and the central processing unit must update contents of this table and decide the transmission direction for each call. In case the position of a slot generator is altered, therefore, the transmission direction for every cell varies and hence tables disposed in respective communication nodes must be rewritten.

(3) In case communication nodes are duplicated in order to improve the reliability, two systems are recognized separately at the time of cell transmission and transmission is conducted. That is to say, the central processing unit must conduct transmission processing for each cell and for each system.

(4) In case information is to be transmitted from one communication node to a plurality of communication nodes among a plurality of communication nodes, i.e., when point-multipoint communication is to be conducted, a cell must be transmitted to both of the two buses. In the above described paper, however, its concrete method is not shown.

SUMMARY OF THE INVENTION

Therefore, an object of the present invention is to eliminate the above described problems of the conventional technique and provide a digital communication network using looped multiple buses for implementing high-speed communication by using a simple apparatus configuration and processing.

Thus, a first object of the present invention is to provide an economical method for effecting synchronism between communication nodes connected in a loop form without using a complicated synchronizing method.

A second object of the present invention is to provide a simple and high-speed routing method which does not use a table to determine the transmission direction of data, i.e., which can immediately determine the transmission direction even when the position of a slot generator is altered.

A third object of the present invention is to provide a simple high-speed routing method even when communication nodes are duplicated.

A fourth object of the present invention is to provide a method needed to implement point-multipoint communication.

A fifth object of the present invention is to provide a method for easily implementing a loop back function in a communication node and provide an apparatus and a communication network facilitating maintenance administration such as fault diagnosis.

In order to achieve the above described objects, an ATM communication system according to the present invention has configurations as described below.

(1) Among a plurality of communication nodes, adjacent communication nodes are connected to each other via buses provided separately for cell transmitting and cell receiving to form a looped configuration. There are provided buffers in each communication node for absorbing timing deviation of cell demultiplexing between communication nodes adjacent to the communication node, i.e., for correcting the timing deviation to bring about coincidence. By reading out data from the buffer at a fixed period capable of absorbing the total delay time including the cell processing time and transmission delay time, or at a period equivalent to an integer times of the fixed period, the phase of cell demultiplexing timing is made identical for all communication nodes.

(2) In each communication node, routing is conducted on the basis of mounting position information on a bus. For implementing this method, there are provided, in each communication node, a memory for storing a position wherein the node is mounted on the bus and a memory for storing the mounting position of a communication node wherein a slot generator is set. Furthermore, there is provided a transmission direction determining unit for automatically determining the cell transmission direction from each communication node based on the information as to the position wherein the communication node is mounted and information as to the position of the communication node wherein the slot generator is set.

(3) When communication nodes are duplicated in order to improve reliability. Duplicated communication nodes are installed in adjacent mounting positions on multiple buses and these two communication nodes are provided with the same mounting position information. Furthermore, there is provided a set position altering unit for altering the slot generator set position depending upon states at the normal time and at the fault time.

(4) There is provided a routing tag providing unit. For point-point communication, the routing tag providing unit provides a routing tag depending upon the mounting position. For point-multipoint communication, the routing tag providing unit provides a routing tag used exclusively for multipoint communication. To be concrete, for a combination of a plurality of destination communication nodes, a peculiar routing tag is defined and cell routing is conducted by using it. Furthermore, in the receiving unit of each communication node, there are provided a table for deciding whether a cell should be accepted and a decision receiving unit for receiving a cell multiplexed on a bus according to contents of the table.

(5) In order to implement the loop back function for outputting a cell inputted from an input line to its own output line via a bus, the cell receiving unit of each communication node for receiving a cell from the bus is disposed on the side of the end point of the bus, i.e., on the output side as compared with a cell transmitting unit for transmitting a cell to the bus.

As a result, the present invention brings about the following advantages.

First, since the time required for cell transmission between communication nodes connected adjacent to each other has been determined to be equal to the time required for each communication node to process the cell, i.e., cell period, or an integer times of the cell period, it becomes possible to uniquely determine the timing of cell processing operation in all communication nodes and a complicated synchronizing method as used in the conventional technique becomes unnecessary. Furthermore, in case multiple buses are configured in a loop form in an ATM communication system having communication nodes connected by the multiple buses, it becomes possible to alter the position of a slot generator without loss of synchronization.

Secondly, multiple buses are configured in a loop form, and each communication node is provided with mounting position information and slot generator position information. In addition, routing between communication nodes is conducted based on mounting position information of each communication node. An algorithm for determining the transmission direction of a cell at that time is determined. Unlike the conventional technique, therefore, it becomes unnecessary to always transmit cells in both directions or set the cell transmission direction on a table. This is effective in reducing communication traffic and simplifying administration of routing information.

Thirdly, multiple buses are configured in a loop form, and duplicated communication nodes are mounted in adjacent positions. These two communication nodes are provided with the same mounting position information. Thereby, with respect to duplicated communication nodes, cell routing can be conducted based on the same routing information. Furthermore, it becomes possible to configure a communication system rendering high service which does not need alteration of routing information even when a fault has occurred.

Fourthly, a connection number is defined for a combination of a plurality of communication nodes. By conducting cell routing by means of a connection number, point-multipoint communication can be supported.

Fifthly, the cell receiving unit in the communication node is disposed after the cell transmitting unit and an algorithm for conducting loop back is determined. Therefore, cell fold back can be conducted easily via a bus. Unlike the conventional technique, there is no need to provide a complicated circuit to implement the loop back function. This is effective in reducing the size and cost.

DETAILED DESCRIPTION OF THE PREFERRED EMBODIMENTS

Hereafter, preferred embodiments of an ATM communication system according to the present invention will be described by referring to drawings.

<Embodiment 1: Synchronizing Method

Figure 1:
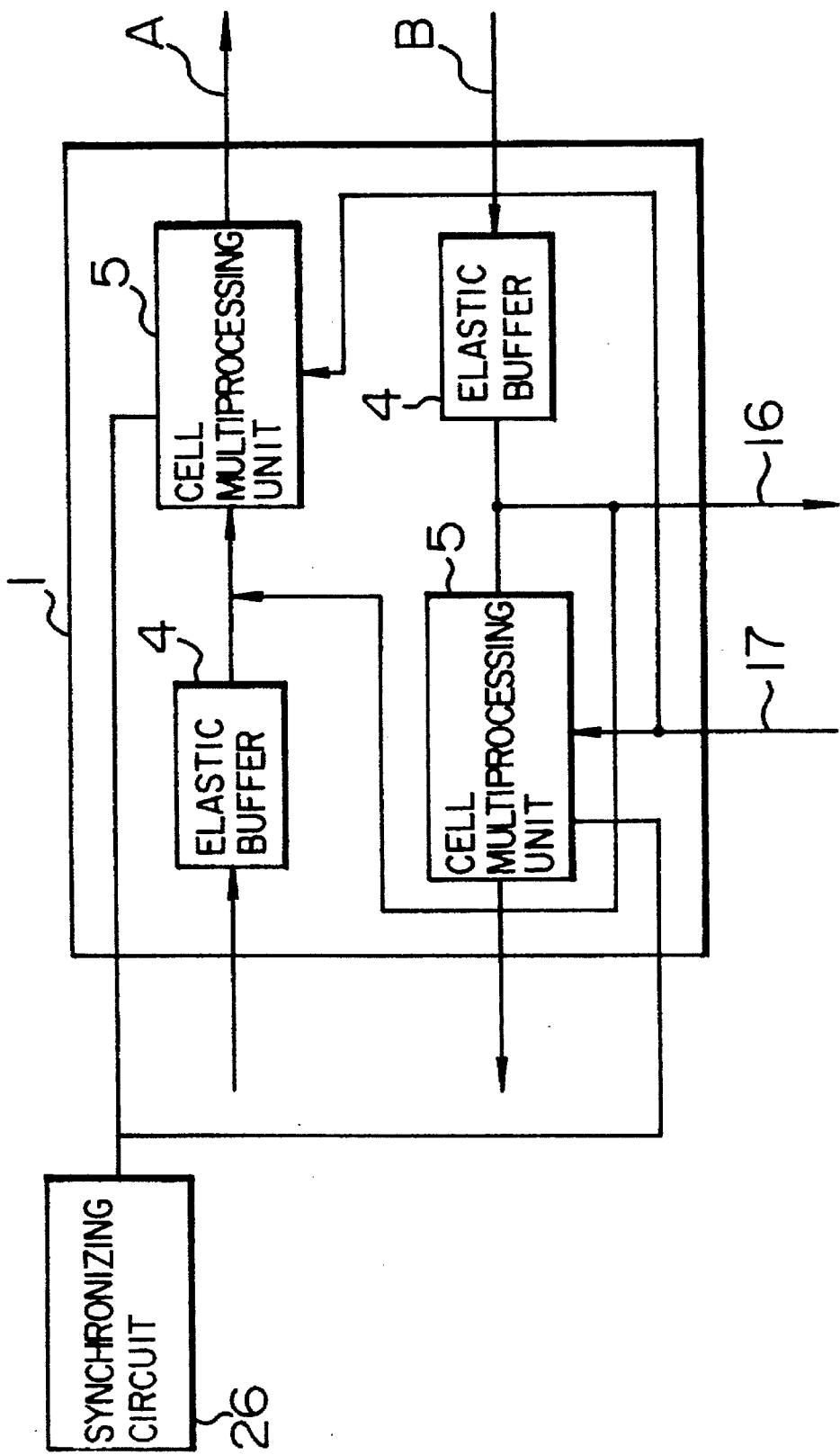
FIG. 1 is a schematic configuration diagram of a communication node of an ATM communication system according to the present invention.
Figure 2:
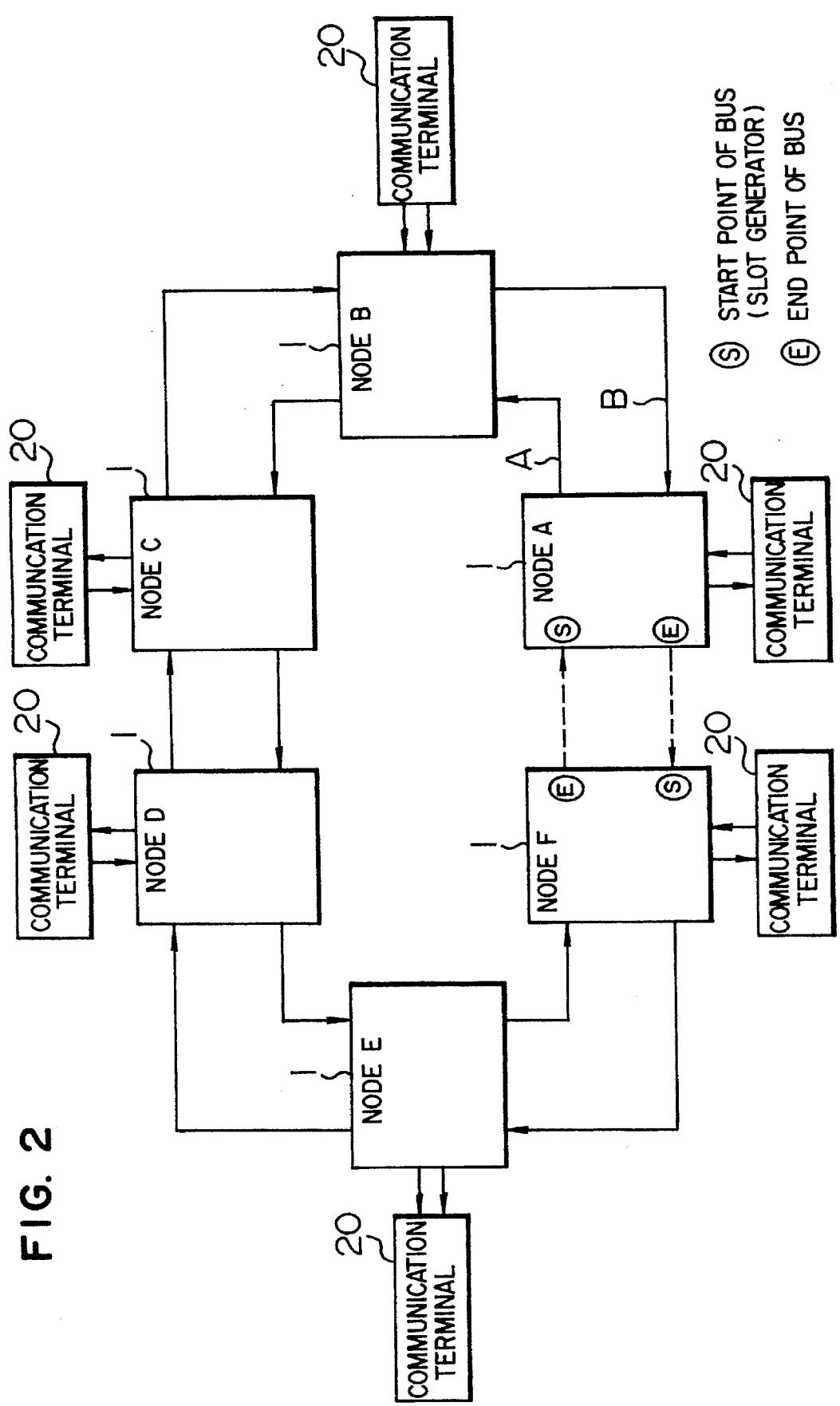
FIG. 2 is a configuration diagram of an ATM communication system having communication nodes connected in a loop form by multiple buses according to the present invention.
Figure 3:
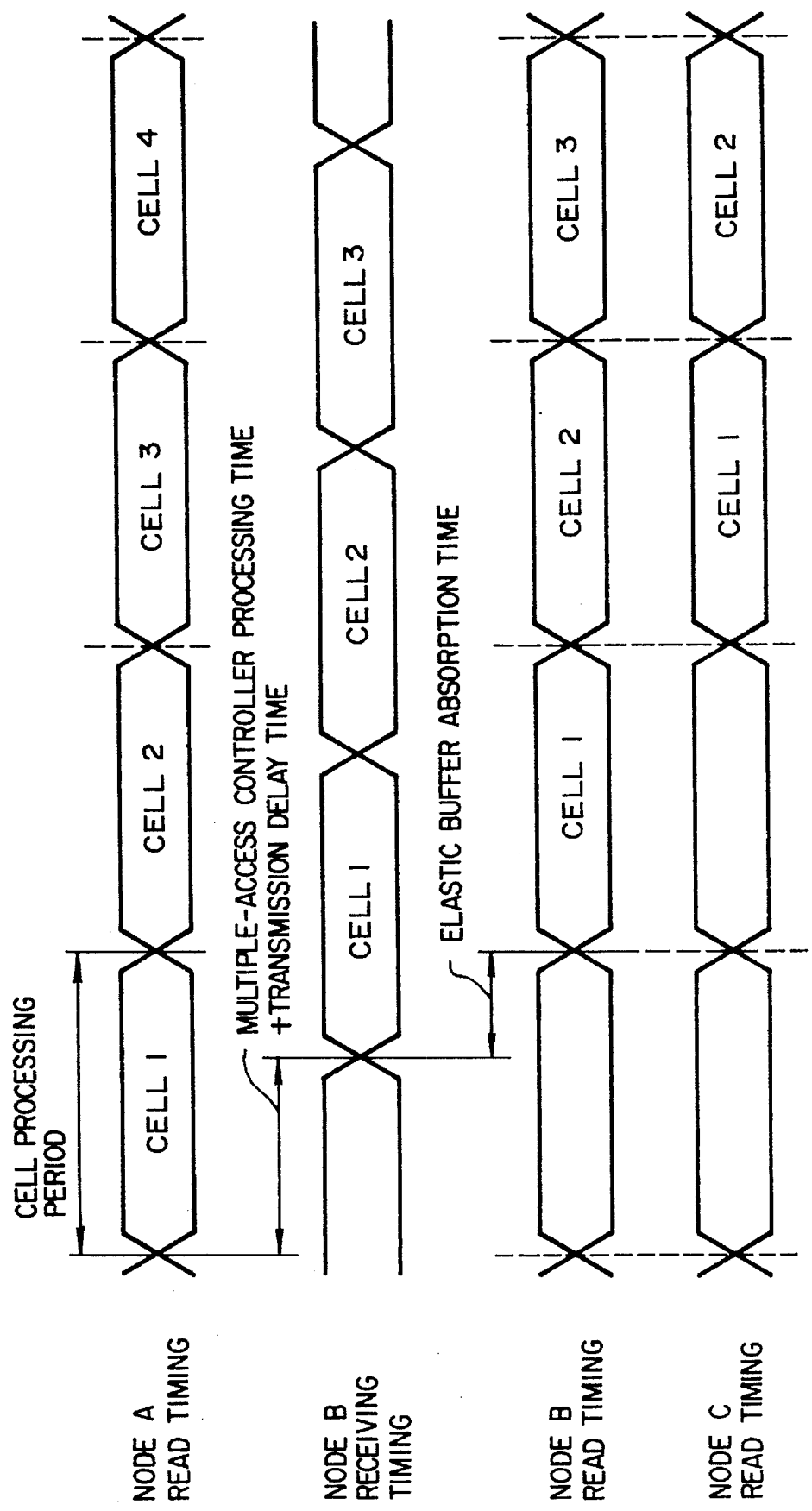
FIG. 3 is a diagram showing timing of cell multiplexing processing conducted in communication nodes according to the present invention.

FIG. 1 is a diagram showing a schematic configuration of each communication node of an ATM communication system according to the present invention. FIG. 2 is a diagram showing the network configuration of an ATM communication system formed by connecting a plurality of communication nodes. FIG. 3 is a diagram showing the timing of transmitting a cell and receiving a cell in each communication node included in the network.

As shown in FIG. 1, a communication node 1 is connected to a multiple bus A and a multiple bus B having a direction opposite to that of the multiple bus A. The communication node 1 includes an elastic buffer 4 and a cell multiprocessing unit 5. For each of the buses A and B, the elastic buffer 4 absorbs the phase difference of transmission data and outputs output data on an output line 16. The cell multiprocessing unit 5 exercises control to multiplex a cell on the bus A and the bus B to transmit data inputted from an input line 17. In addition, the cell multiprocessing unit 5 controls read timing of the elastic buffer on the basis of a synchronizing pulse supplied from a synchronizing circuit 26. To the output line 16 and the input line 17, a communication terminal 20 as shown in FIG. 2, for example, is connected.

FIG. 2 shows a communication network formed by connecting a plurality of communication nodes 1 in a loop form and connecting a communication terminal 20 to each communication node. Each of the bus A and bus B is successively connected between adjacent communication nodes 1 to form a loop as a whole. At this time, it is assumed that each of the bus A and the bus B has a bus start point Ⓢ (slot generator) and a bus end point Ⓔ and data flowing between the bus start point and the bus end point are discarded at the bus start point.

At this time, a cell transmitted to an adjacent communication node deviates in phase by the sum of the cell processing time in the multiple-access controller and transmission delay time of data as shown in FIG. 3. Therefore, this phase deviation is absorbed by the elastic buffer 4 to align the phase of cells respectively flowing through the bus A and the bus B so that the timing of readout from the elastic buffers 4 in respective nodes (the head phase of received cells after absorption of phase deviation by the elastic buffers 4) may become uniform.

That is to say, multiprocessing of cells in respective communication nodes for the bus A and bus B is carried out at timing as shown in FIG. 3. For both the bus A and bus B, all communication nodes can read out cells from the elastic buffers 4 at the same timing.

Thereby, timing of multiprocessing of cells in respective communication nodes can be determined without being conscious of cell synchronizing. Furthermore, even if the position of the slot generator is altered, timing of multiprocessing of cells does not change. Unlike the conventional technique, therefore, a complicated cell synchronizing circuit is not needed. Even when the position of the slot generator is altered, the loss of synchronization does not occur.

<Embodiment 2: Cell Transmitting and Receiving Method

Assuming now in the ATM communication system formed by connecting a plurality of communication nodes as shown in FIG. 2 that the slot generator defining the head of multiple bus is disposed in the node A and node F respectively for the bus A and bus B, an embodiment of the cell transmitting and receiving method will be described.

(1) Transmitting Method

Figure 4:
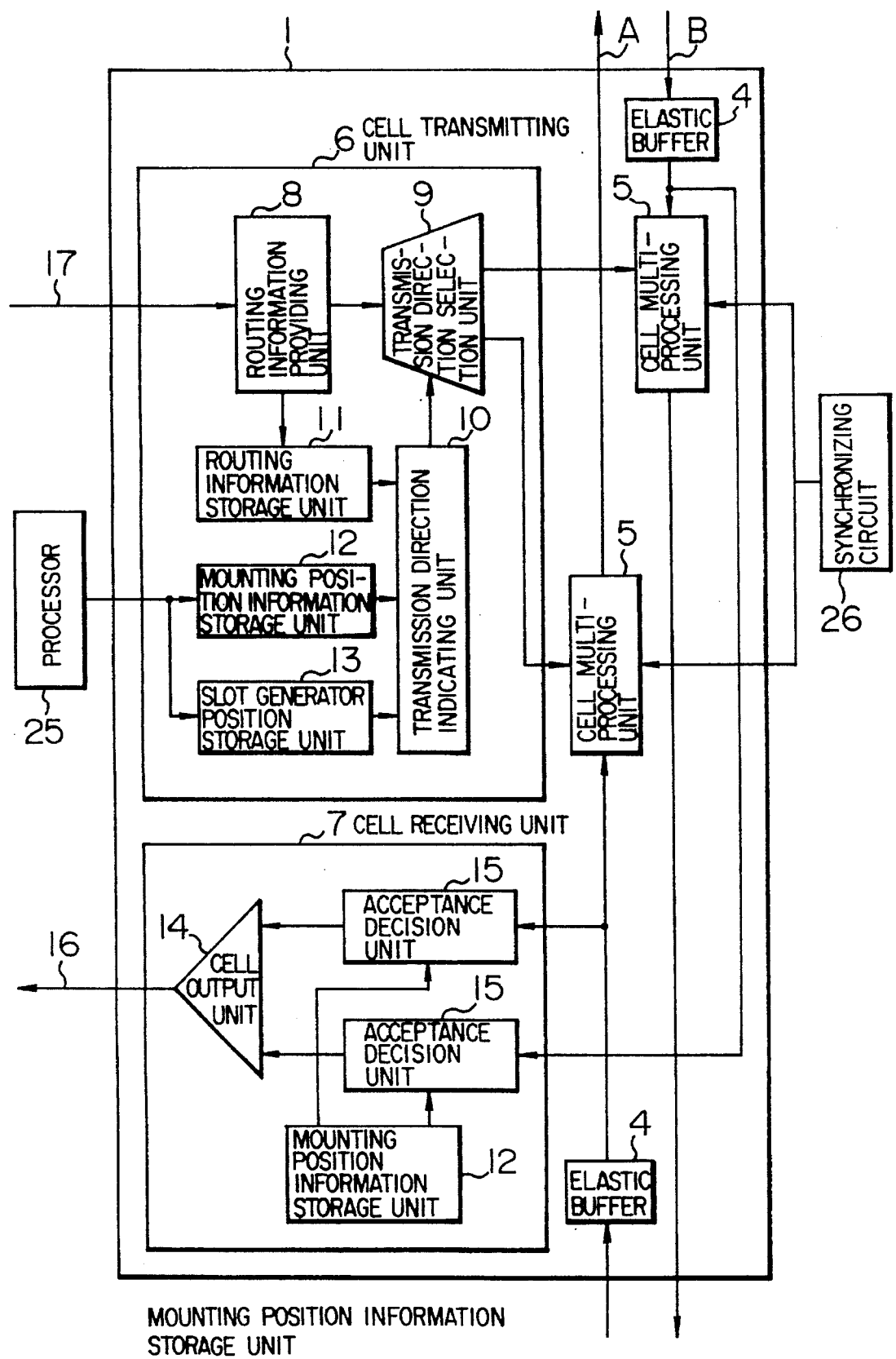
FIG. 4 is a configuration diagram of a cell transmitting unit and a cell receiving unit of a communication node according to the present invention.

FIG. 4 is a diagram showing detailed configuration of each communication node 1 (configuration of a cell transmitting unit and a cell receiving unit). Each communication node 1 includes a cell transmitting unit 6 and a cell receiving unit 7. The cell transmitting unit 6 transmits cells inputted from an input line 17 to the bus A or the bus B via the cell multiprocessing unit 5. The cell receiving unit 7 receives cells from the bus A or the bus B and outputs those cells to the output line 16. Common synchronizing pulses are transmitted from the synchronizing circuit 26 to communication nodes 1 and used to control read timing of the elastic buffers 4.

The cell transmitting unit 6 includes a routing information providing unit 8 for providing cells with routing information indicating relationship between input and transmission destination, a transmission direction selection unit 9 for distributing cells to the bus A or bus B, a transmission direction indicating unit 10 for informing the transmission direction selection unit 9 of the cell transmission direction, a routing information storage unit 11 for storing routing information of respective cells, a mounting position information storage unit 12 for storing the mounting position of the communication node 1 on a bus, and a slot generator position storage unit 13 for storing position information, on a bus, of a communication node having a slot generator set therein.

The cell receiving unit 7 includes a mounting position information storage unit 12 which is identical with the mounting position information storage unit 12 included in the cell transmitting unit 6, acceptance decision units 15 for deciding whether cells respectively inputted from the bus A and the bus B can be accepted, and a cell output unit 14 for multiplexing a cell received from the bus A or the bus B on the output line 16 and outputting it.

In the present embodiment, the mounting position information storage unit 12 is disposed in both the cell transmitting unit 6 and the cell receiving unit 7. Since stored information is identical, however, a single mounting position information storage unit 12 may be disposed in a common part of the communication node 1. Numeral 25 denotes a processor for setting data in the mounting position information storage unit 12 and the slot generator position storage unit 13.

Figure 5:
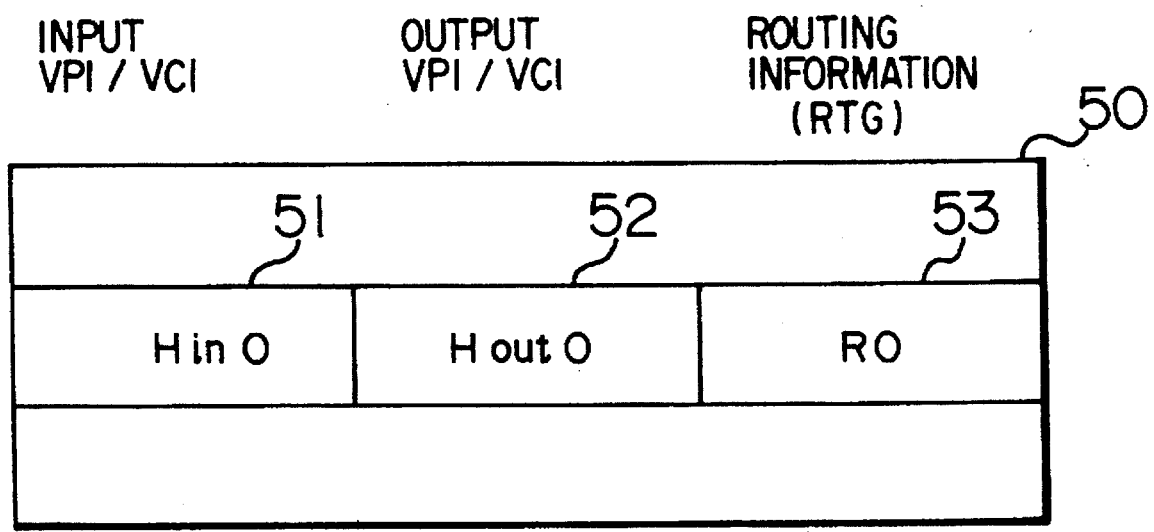
FIG. 5 is a configuration diagram of a table of routing information within the cell transmitting unit of a communication node according to the present invention.

FIG. 5 shows the configuration of a table 50 for storing routing information disposed in the routing information providing unit 8 included in the cell transmitting unit 6. As for an inputted cell, input VPI/VCI representing header information is converted to output VPI/VCI by referring to this table. Furthermore, the inputted cell is provided with routing information RTG and transmitted onto a bus.

Figure 6:
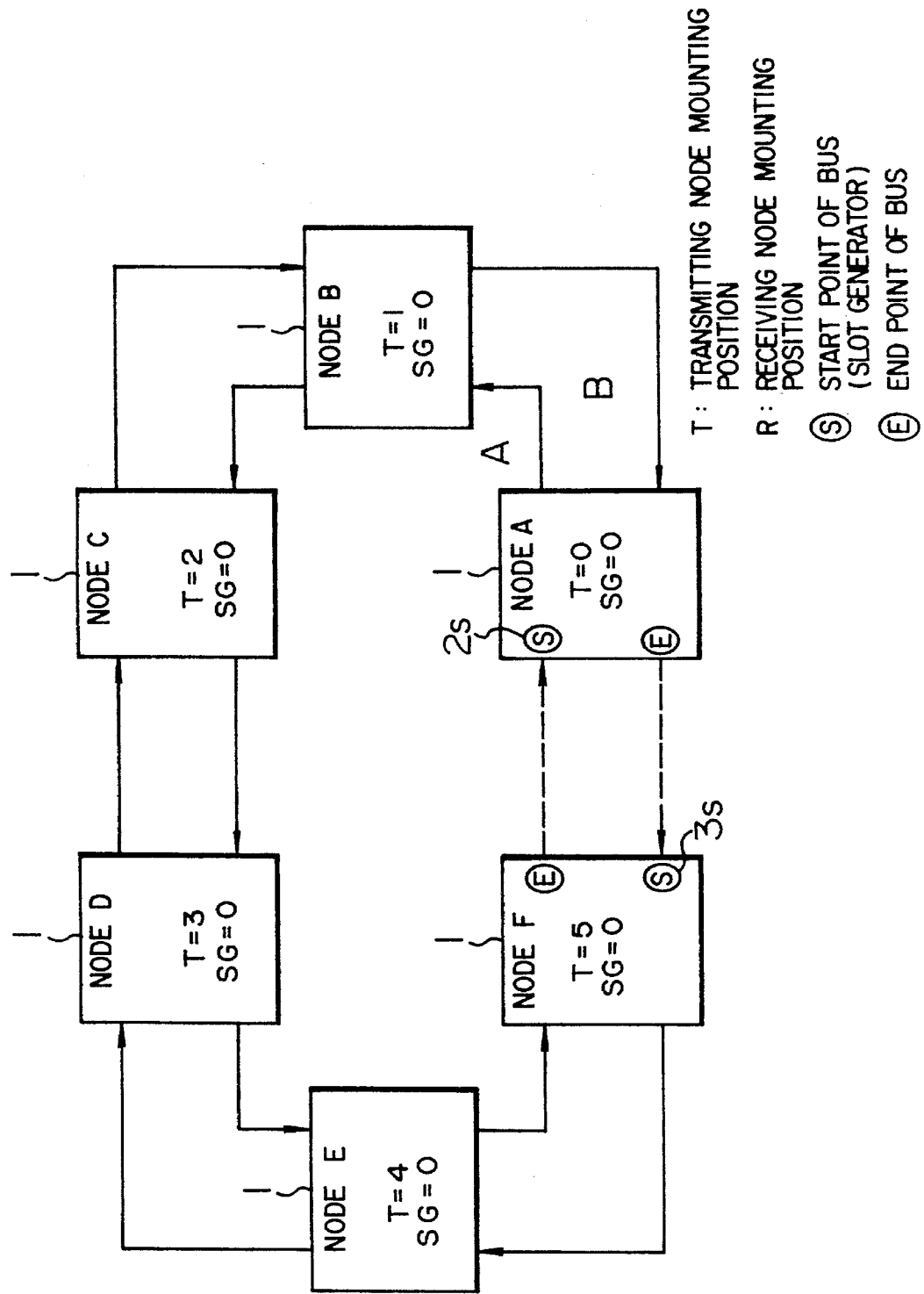
FIG. 6 is a diagram showing a connected configuration of the ATM communication system and how to provide each communication node with mounting information according to the present invention.

As to the system configuration formed by connecting a plurality of communication nodes as shown in FIG. 2, FIG. 6 exemplifies values set in the mounting position information storage unit 12 and the slot generator position storage unit 13 disposed in each communication node. Based on the values, the transmission direction indicating unit 10 decides which of the bus A and bus B the cell should be transmitted to according to a procedure shown in FIG. 7.

Hereafter, an example of operation using the cell transmission direction determining method according to the present invention will be described in detail.

First of all, mounting positions "T" representing physical arrangements and orders of communication nodes A to F are allocated along a direction of flow of cells on the bus A and set in the mounting position information storage unit 12 by the processor 25. In the present embodiment, T=0, 1, 2, 3, 4 and 5 are respectively set in the mounting position information storage units 12 respectively of the nodes A, B, C, D, E and F as shown in FIG. 6.

Then, the position of a slot generator is defined in the form of the mounting position of the communication node having the slot generator set on the bus A and set in the slot generator position storage unit 13 by the processor 25. The value set in the slot generator position storage unit 13 is expressed by SG. In the present embodiment, the slot generator Ⓢ of the bus A is set to the communication node A. As shown in FIG. 6, therefore, SG=0 is set in the slot generator position storage units 13 of respective communication nodes 1.

Then in the routing information providing unit 8, each cell is provided with routing information (hereafter referred to as R) defined by the mounting position of the receiving node. The routing information is stored in the routing information storage unit 11. To be more concrete, header information VPI/VCI of a cell inputted from the input line 17 is converted from Hind (51) to Hout0 (52) by referring to the routing information providing table 50 shown in FIG. 5. In addition, the cell is provided with mounting position information R0 (53) of the communication node of transmission destination as routing information.

Figure 7:
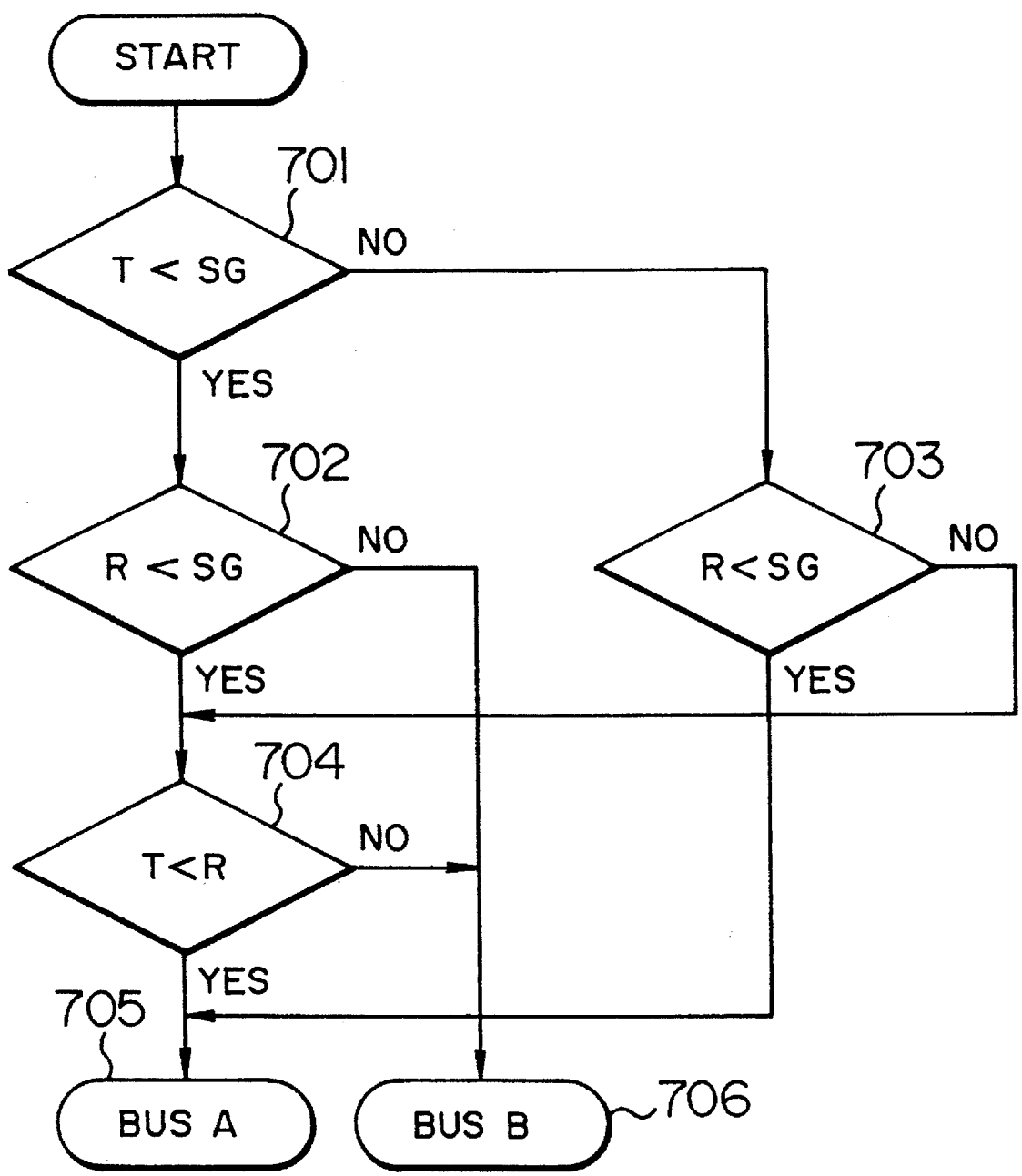
FIG. 7 is a flow chart showing a procedure whereby a communication node determines the transmission direction of multiple buses according to the present invention.

In the transmission direction indicating unit 10, the transmission direction is determined on the basis of values of T, SG and R in accordance with the procedure shown in FIG. 7. That is to say, T is first compared in magnitude with SG and R is compared in magnitude with SG. If both T and R are smaller than SG (i.e., answer of both 701 and 702 is yes), or if both T and R are equal to or larger than SG (i.e., answer of both 701 and 703 is no), T is compared with R. If T is smaller than R (i.e., answer of 704 is yes), the cell is transmitted to the bus A (705). Otherwise (i.e., answer of 704 is no), the cell is transmitted to the bus B. On the other hand, if T is smaller than SG and R is equal to or larger than SG (i.e., answer of 701 is yes and answer of 702 is no), the cell is transmitted to the bus B. Furthermore, if T is equal to or larger than SG and R is smaller than SG (i.e., answer of 701 is no and answer of 703 is yes), the cell is transmitted to the bus A. This procedure can be easily implemented by firmware using a logic circuit or a processor, or software control.

When determining the cell transmission direction in the routing information providing unit 8, the configuration and operation heretofore described make the conventional table of the communication path and data transmission direction unnecessary. Furthermore, even in case the position of a slot generator is altered, only rewriting the contents of the slot generator position storage unit 13 is needed and it is unnecessary to update data transmission direction for each communication path unlike the conventional technique. Therefore, the time required for resuming the communication can be shortened.

(2) Receiving Method

For example, if a cell is to be transmitted from the communication node B to the communication node E in FIG. 6, the transmission node B provides the transmission cell with the mounting position information "T=4" of the communication node E as routing information R. That is to say, the cell is sent out with R=4.

Furthermore, since the mounting position information T=1 and slot generator position information SG=0 are stored in the communication node B, the transmission cell is decided to be sent out to the bus A according to the procedure shown in FIG. 7. In the acceptance decision unit 15 in the communication node E, the routing information R of cells received from the bus A and the bus B is compared with the mounting position information T=4 set in the mounting position information storage unit 12 to make a decision as to whether the cell should be accepted. If the mounting position information T coincides with the routing information R of the received cell as a result of decision, the received cell is outputted to the output line 16 via the cell output unit 14 as the cell addressed to its own node.

In the present embodiment, the mounting position information of the communication node E is T=4 and hence the cell with the routing information R=4 is received. The communication nodes C, D and F do not receive the cell with the routing information R=4. As a result, the communication node E can receive the cell transmitted from the communication node B.

<Embodiment 3: Duplication of Communication Nodes>

Figure 8:
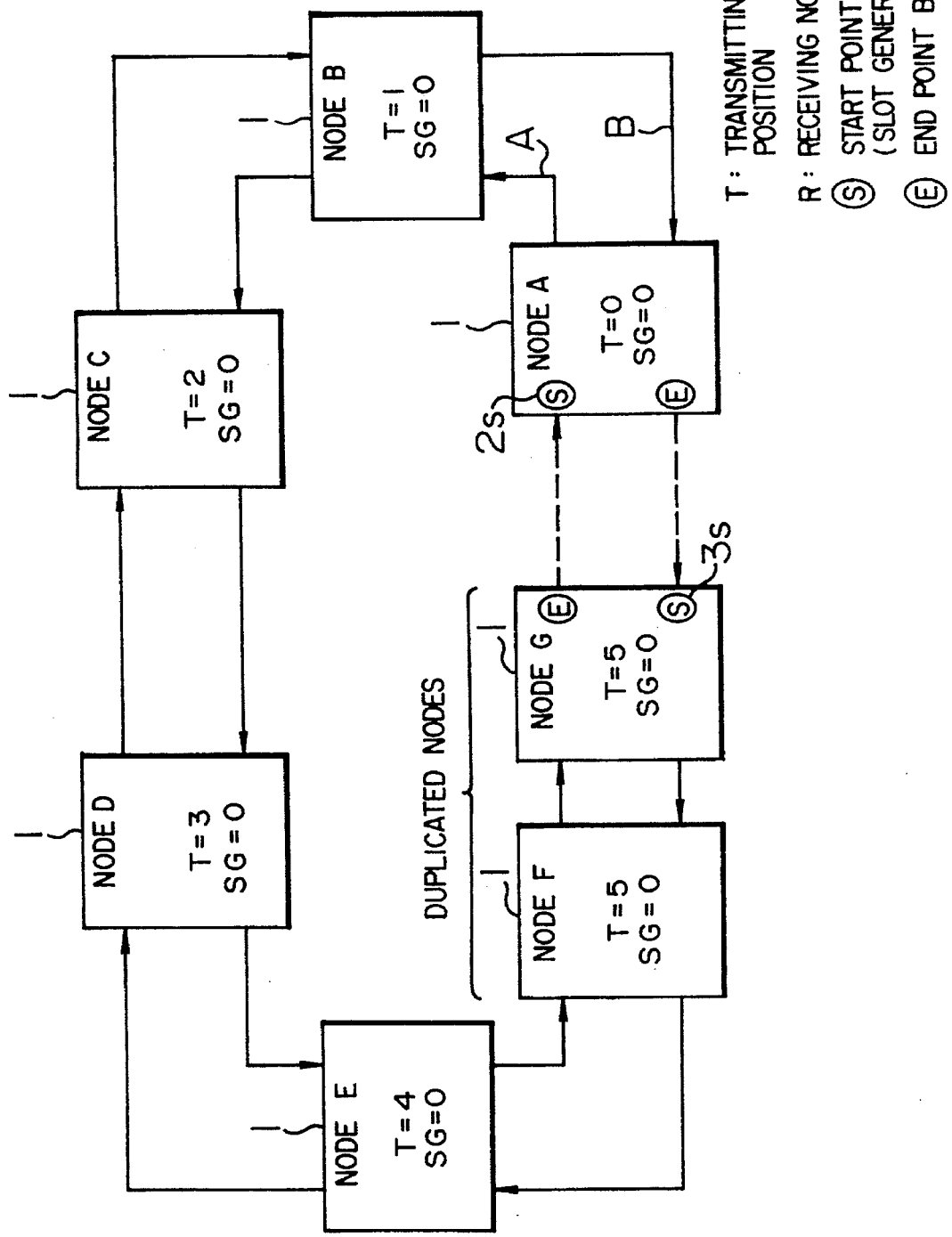
FIG. 8 is a configuration diagram of an ATM communication system having duplicated communication nodes according to the present invention (in normal operation)
Figure 9:
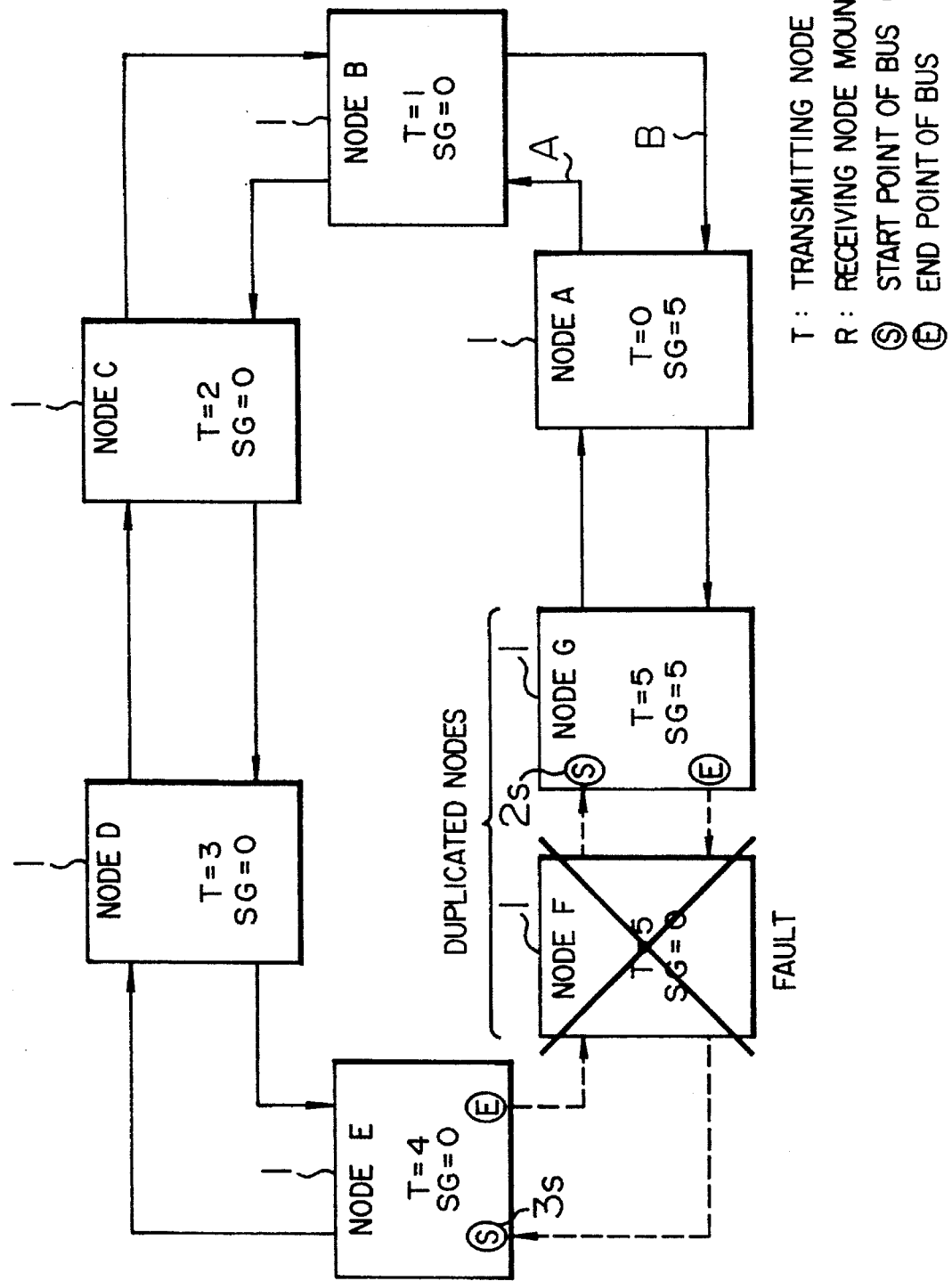
FIG. 9 is a configuration diagram of an ATM communication system having duplicated communication nodes according to the present invention (at the time of a fault)

FIG. 8 shows the configuration (communication node arrangement and mounting position information setting) of a system in case a communication node 1 has been duplicated in order to improve the reliability. In the present embodiment, communication nodes F and G are duplicated nodes.

In case a communication node is duplicated, both the duplicated nodes F and G must be connected so that they may be seen in the same direction of the bus when they are seen from another communication node. To this end, the duplicated communication node F and communication node G are mounted in adjacent positions. On the bus A, a slot generator 2s is inhibited from being set in the communication node G. On the bus B, a slot generator 3s is inhibited from being set in the communication node F. Furthermore, as for the mounting position information "T", the same value is set in the communication node F and the communication node G. In the present embodiment, T=5 is set in both the communication node F and the communication node G. Without being conscious of duplication, therefore, other communication nodes can provide the duplicated communication node with the same routing information in the same way as the case of singularity. In the same way as the simplex, other communication nodes can determine the cell transmission direction and transmit and receive cells.

When a fault has occurred in the communication node F, the central processing unit cancels clauses forbidden at the normal time, sets the positions of the slot generators 2s and 3s respectively in the communication nodes G and E respectively on the buses A and B, and thus disconnects the faulty communication node F from the bus A and the bus B. At this time as well, it is not necessary to alter the method for providing routing information and the method for determining the transmission direction in each communication node. By only rewriting contents of the slot generator position storage unit 13 of each communication node so that SG=5 may be stored, it is possible at the time of a fault as well to determine the cell transmission direction and conduct cell transmitting and receiving in the same way as the embodiment 2. The present invention can be applied to not only duplication of a communication node but also redundant configuration having a multiplicity number larger than two.

<Embodiment 4: Multipoint Communication

Hereafter, operation of an embodiment of point-multipoint communication will be described by referring to FIGS. 10 to 12.

Figure 10:
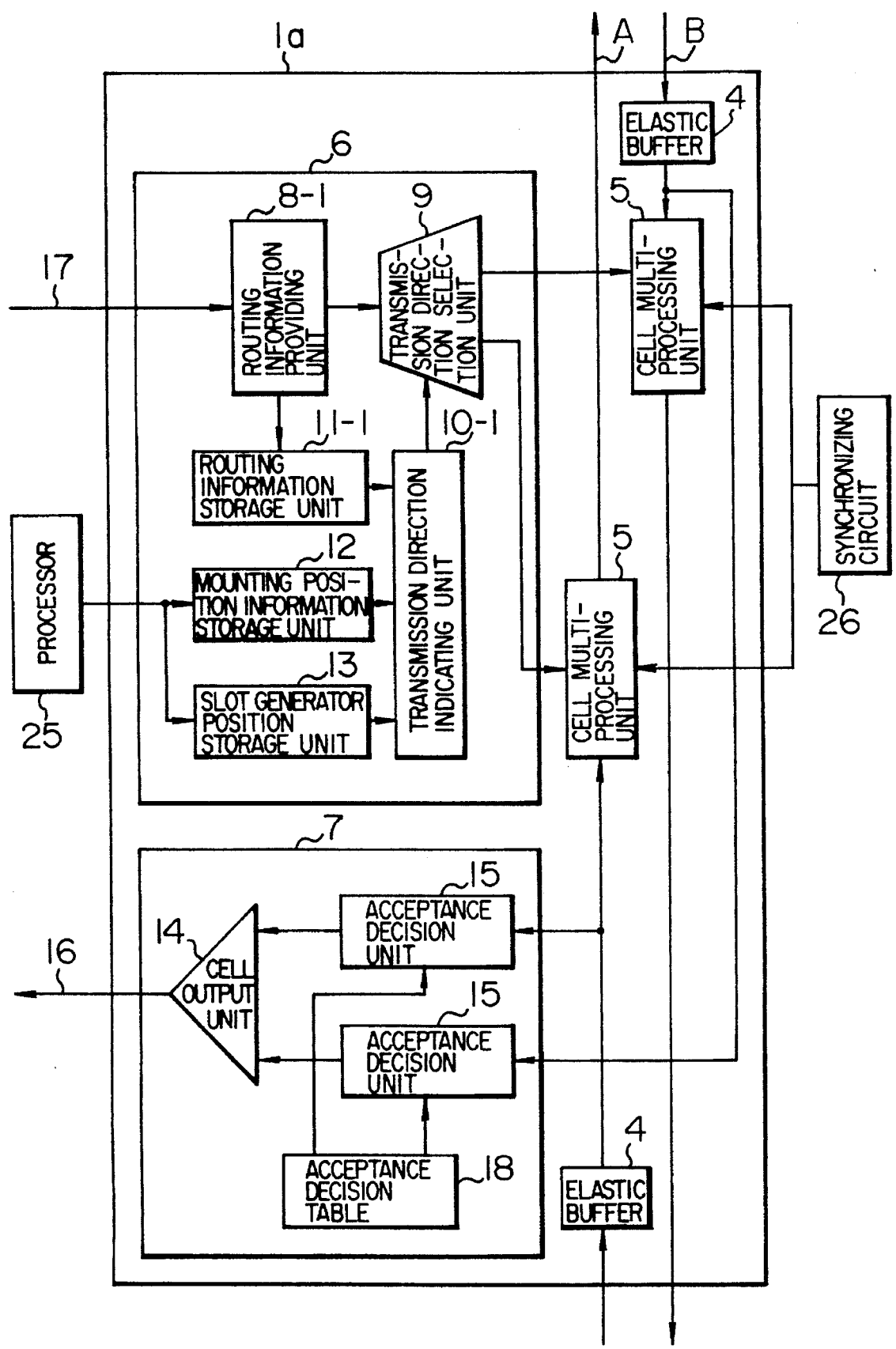
FIG. 10 is a configuration diagram of a cell transmitting unit and a cell receiving unit of a communication node for effecting point-multipoint communication according to the present invention.

FIG. 10 is a diagram showing the configuration of a communication node 1a for performing point-multipoint communication. FIG. 11 is a diagram showing the configuration of a table used in a routing information providing unit 8-1 included in the communication node 1a. FIG. 12 shows a procedure for determining the transmission direction in a transmission direction indicating unit 10-1 included in the communication node 1a.

In the routing information providing unit 8-1, a cell of point-point communication is provided with routing information R defined on the basis of the mounting position of a receiving node in the same way as the embodiments 1 to 3. As for cells of point-multipoint communication, routing information exclusively for multipoint communication, i.e., a connection number (hereafter referred to as MC) for each combination of receiving nodes involved in the point-multipoint communication is defined and the cell is provided therewith.

Figure 11:
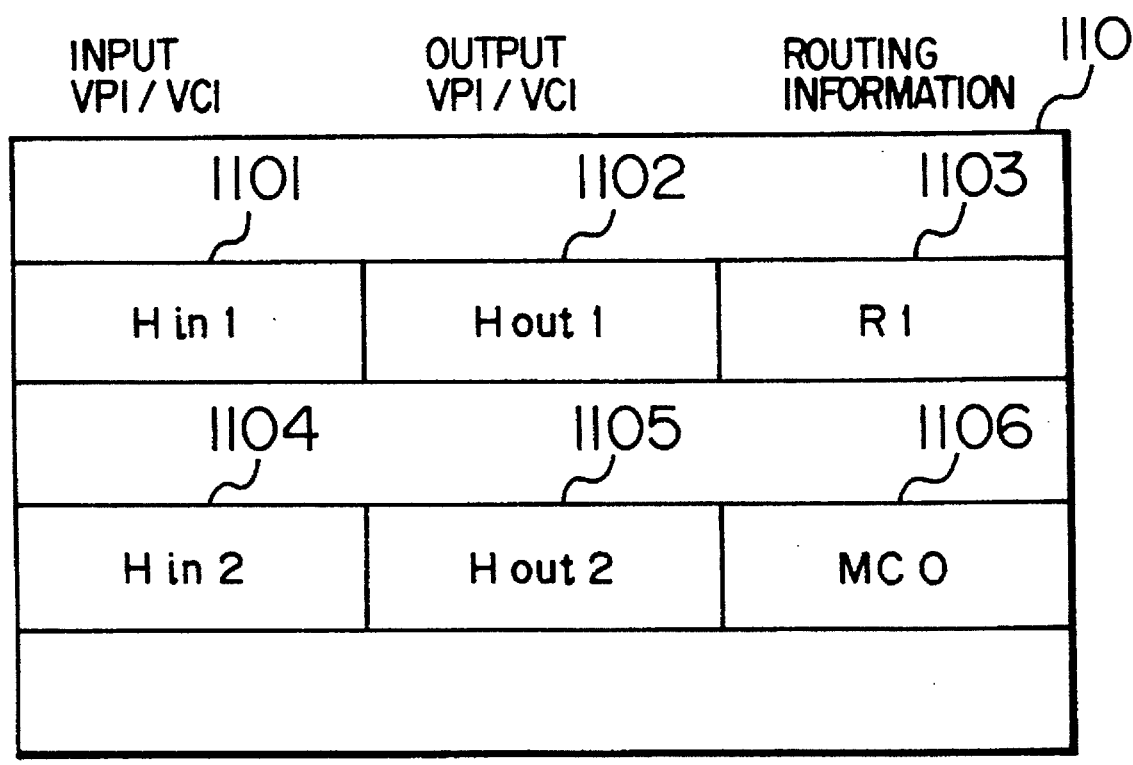
FIG. 11 is a configuration diagram of a table of routing information within a cell transmitting unit for effecting point-multipoint communication according to the present invention.

To be concrete, for a cell of point-point communication, header information VPI/VCI thereof is converted from Hin1 (1101) to Hout1 (1102) by referring to the routing information providing table 110 shown in FIG. 11. In addition, the cell is provided with mounting position information R1 (1103) of the communication node of transmission destination of point-point communication as routing information. Furthermore, for a cell of point-multipoint communication, header information VPI/VCI thereof is converted from Hin2 (1104) to Hout2 (1105) and the cell is provided with combination information MC0 (1106) of communication nodes of transmission destination of point-multipoint communication as routing information.

Figure 12:
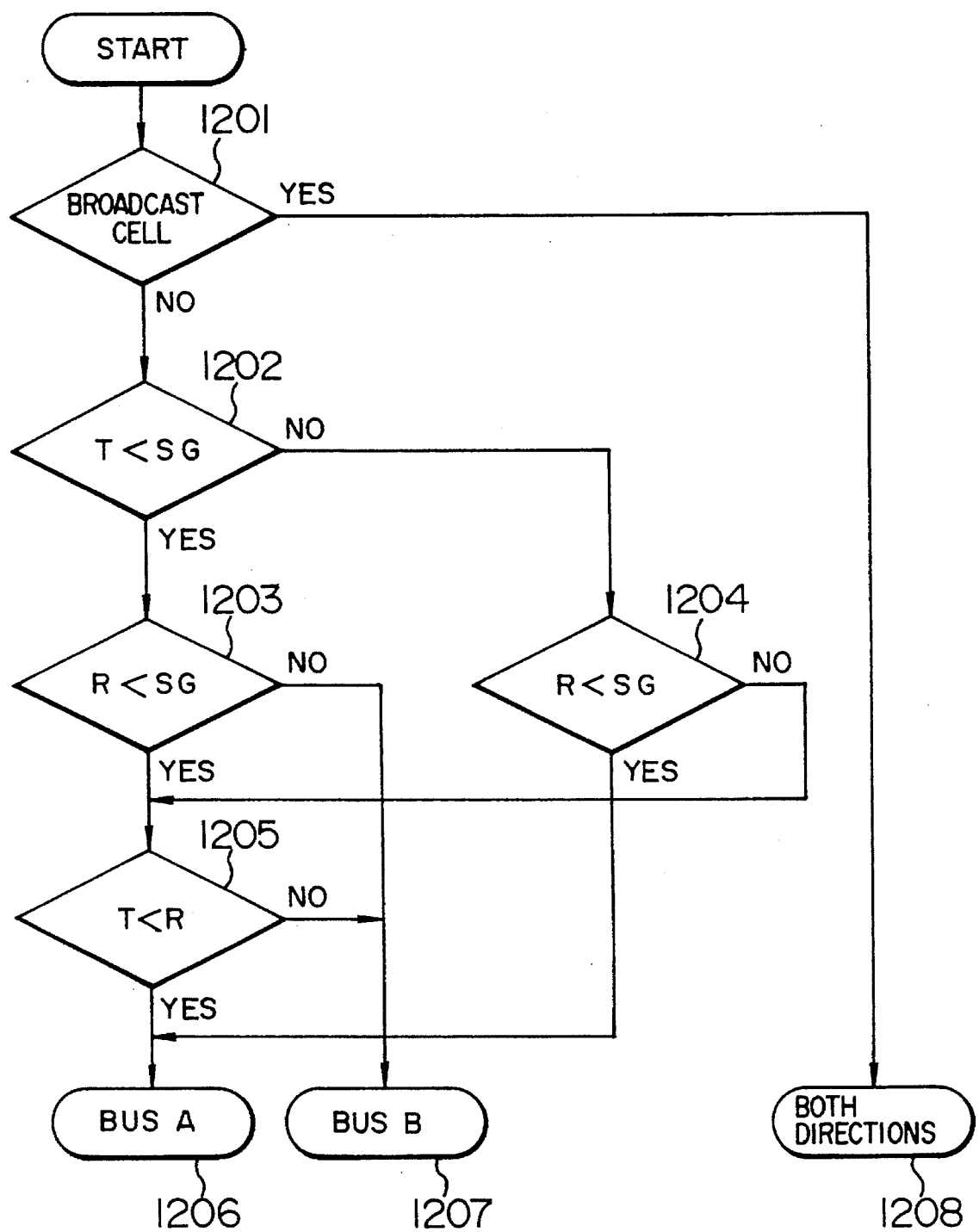
FIG. 12 is a flow chart showing a procedure for determining the transmission direction when effecting point-multipoint communication according to the present invention.

In the transmission direction indicating unit 10-1, the transmission direction is determined on the basis of the routing information R or MC stored in a routing information storage unit 11-1 and T and SG in accordance with the procedure shown in FIG. 12. If the cell to be transmitted is a cell of point-multipoint communication, the cell is transmitted in both directions of buses A and B (1201 yes). If the cell to be transmitted is a cell of point-point communication (1201 no), the transmission direction is determined in accordance with a procedure similar to that of FIG. 7. The reason why the cell is transmitted in both directions of the buses A and B in case the cell to be transmitted is a cell of point-multipoint communication is that processing for determining the transmission direction for each of the transmission destinations can be eliminated thereby.

On the receiving side, an acceptance decision table 18 for deciding whether a received cell should be accepted on the basis of routing information of the cell in the same way as the embodiments 1 to 3 holds routing information (R and MC) of cells to be received by the communication node in a table form and accepts a cell when the routing information of the cell has coincided with a value held in the table.

For example, in case the node B conducts point-multipoint communication with the node E and the node A in the configuration of FIG. 6, the central processing unit defines a connection number MC representing the node E and node A as the combination of transmission destinations and sets the connection number MC in the routing information providing table of the node B. The central processing unit sets the defined connection number MC in the acceptance decision tables 18 of the node A and the node E as well. Assuming that MC=6, for example, is defined as the connection number, the routing number used for point-point communication is 1 to 5 and hence the connection number can be used as routing information exclusively for point-multipoint communication.

In accordance with the procedure shown in FIG. 12, the node B transmits this cell in both directions of buses A and B. The node A receives this cell from the bus B. Since MC=6 is set in the acceptance decision table 18, the node A accepts the cell. The node E receives this cell from the bus A. Since MC=6 is set in the acceptance decision table 18, the node E accepts the cell. As a result, point-multipoint communication can be realized. The connection number is defined by using a combination of destination communication nodes. If combinations of destination communication nodes are the same, the same connection number can be used even if communication nodes of transmission sources are different.

<Embodiment 5: Loop Back Method>

Hereafter, operation of an embodiment of a loop back method according to the present invention will be described by referring to FIGS. 13 and 14.

Figure 13:
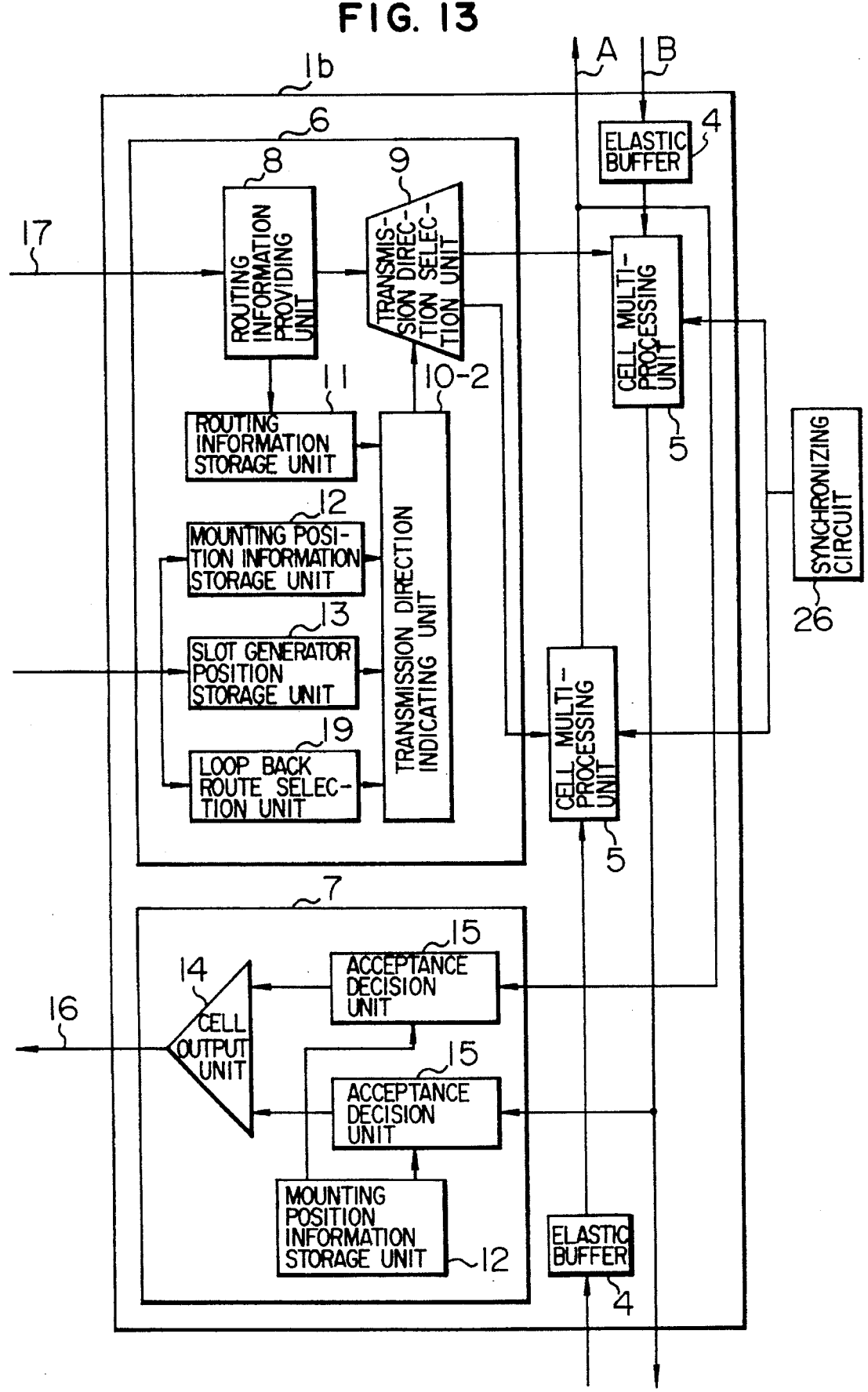
FIG. 13 is a configuration diagram of a cell transmitting unit and a cell receiving unit of a communication node having a loop back function according to the present invention.

FIG. 13 is a diagram showing the configuration of a communication node 1b in case loop back function from the input line 17 to the output line 16 is provided. At this time, since the cell receiving unit 7 for receiving cells from a bus included in the communication node is disposed after the cell transmitting unit 6 for transmitting cells to a bus, loop back can be performed by providing the cell with routing information addressed to its own communication node in the routing information providing unit 8.

Figure 14:
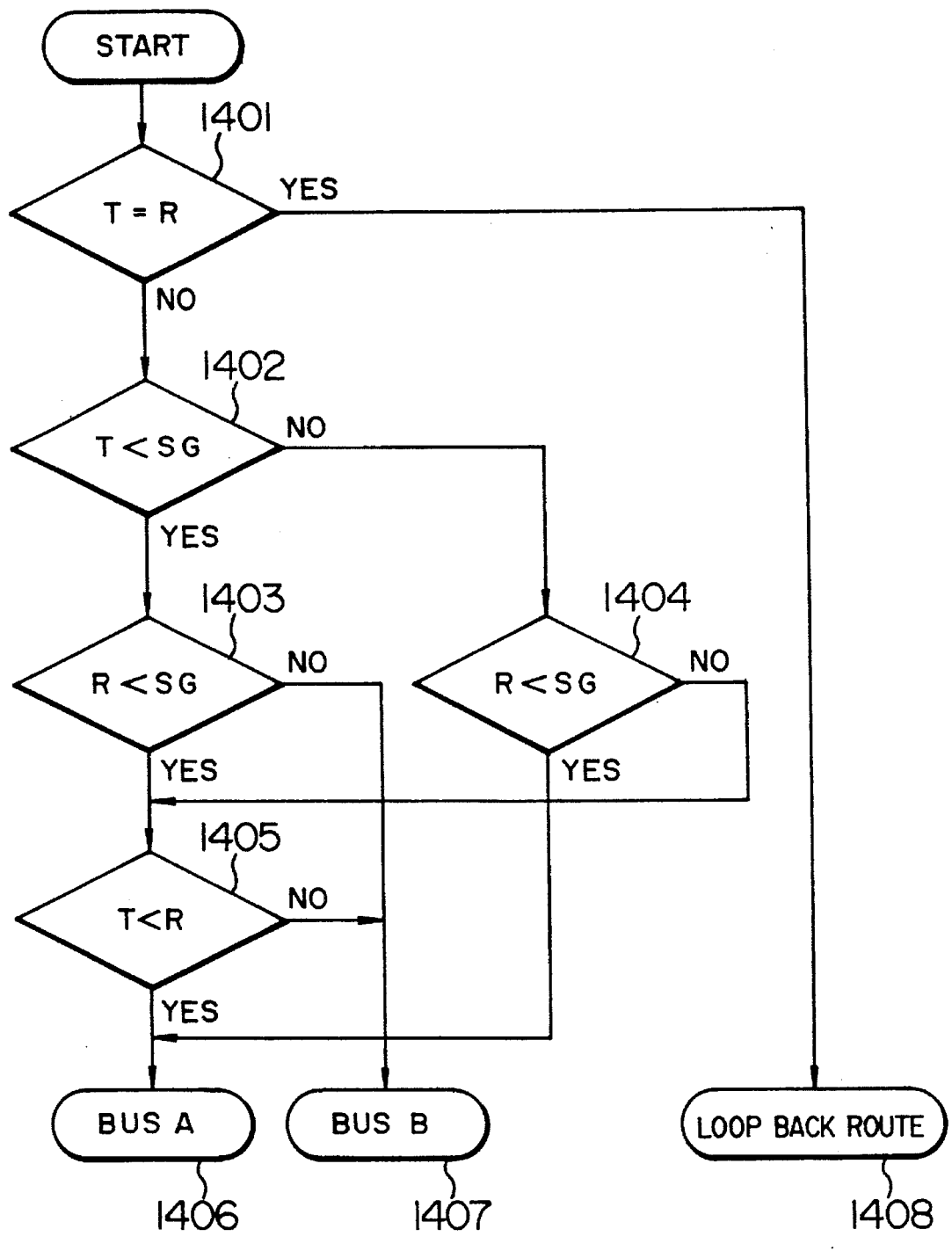
FIG. 14 is a flow chart showing a procedure for determining the transmission direction in case loop back is conducted in a communication node according to the present invention.

Furthermore, a transmission direction indicating unit 10-2 determines the transmission direction in accordance with a procedure shown in FIG. 14. To be concrete, the central processing unit first sets either the bus A or the bus B in a loop back route selection unit 19 as the loop back route beforehand. When T is equal to R (1401 yes), the cell is transmitted to the bus A or bus B in accordance with the look back route set in the loop back route selection unit 19. Acceptance decision units 15 of the bus A and bus B are respectively connected to multiple buses on output sides of cell multiprocessing units 5 to decide whether a cell should be accepted.

If the bus A or bus B is fixedly used as the loop back route, the loop back route selection unit 19 is unnecessary.

As a result, cell loop back from the input line 17 to the output line 16 can be easily implemented without providing a complicated circuit for implementing the loop back function. Furthermore, at this time, loop back via the bus A or loop back via the bus B can be selected. That is to say, since loop back using a bus in operation can be made, maintenance operation such as fault analysis of communication nodes can be easily conducted.

I claim:

1. An ATM communication system comprising:

a plurality of communication nodes connected in a physical loop form by two transmission means having opposite cell transmission directions relative to each other, each of said two transmission means has a logical start point and an end point;

buffer means disposed in each communication node to transmit and receive a cell, said buffer means being connected to said two transmission means;

synchronizing pulse generating means connected to said each communication node to generate a timing pulse for reading out a cell from said buffer means;

cell multiplexing means disposed in said each communication node to multiplexing a cell to said two transmission means, said cell multiplexing means having an input port and an output port which is connected to said two transmission means;

cell transmitting means disposed in said each communication node to transmit a cell from an input line to said cell multiplexing means, said cell transmitting means being connected to said cell multiplexing means;

cell receiving means disposed in said each communication node to receive a cell from said two transmission means and to supply said cell to an output line, said cell receiving means being connected to said cell multiplexing means at said output port;

first storage means disposed in said each communication node to store information identifying said each communication node connected by said transmission means;

second storage means disposed in said each communication node to store information identifying a communication node functioning as a logical start point of a physical loop; and direction selecting means disposed in said each communication node to select a cell transmission direction from said opposite cell transmission directions based on said information stored in said first and second storage means.

2. An ATM communication system according to claim 1, wherein said information identifying a communication node stored in said first storage means includes information indicating a mounting position of said each communication node on the loop.

3. An ATM communication system according to claim 1, wherein said information identifying a communication node functioning as a logical start point of a physical loop stored in second storage means includes information indicating a mounting position of said communication node functioning as a slot generator indicating a logical start point.

4. An ATM communication system according to claim 1, wherein among said communication nodes a plurality of communication nodes having a redundant configuration are disposed adjacent to each other, and each of said first and second storage means comprises a memory for storing the same information, and means responsive to occurrence of a fault in one of said communication nodes having the redundant configuration for changing a logical start point of the loop to such a position as to disconnect a faulty communication node from the loop and for simultaneously altering information stored in said second storage means.

5. An ATM communication system according to claim 1, wherein said each communication node further comprises:

means for providing a cell with information indicating a plurality of destination communication nodes.

6. An ATM communication system comprising:

a plurality of communication nodes connected in a physical loop form by two transmission means having opposite cell transmission directions relative to each other, each of said two transmission means has a logical start point and an end point;

buffer means disposed in each communication node to transmit and receive a cell, said buffer means being connected to said two transmission means;

synchronizing pulse generating means connected to said each communication node to generate a timing pulse for reading out a cell from said buffer means;

cell multiplexing means disposed in said each communication node to multiplex a cell to either of said two transmission means, said cell multiplexing means having an input port and an output port which is connected to said two transmission means;

cell transmitting means disposed in said each communication node to transmit a cell from an input line to said cell multiplexing means, said cell transmitting means being connected to said cell multiplexing means; and cell receiving means disposed in said each communication node and connected to both of said two transmission means at positions prior to said cell transmitting means, said cell receiving means receives a cell from either of said two transmission means and supplies said cell to an output line, said cell receiving means being connected to said cell multiplexing means at said output port.

7. An ATM communication system according to claim 6, wherein each communication node further comprises means for specifying said communication node as a destination communication node.

8. An ATM communication system according to claim 6, wherein each communication nodes further comprises means for selecting either of said two transmission means.

9. An ATM communication system comprising:

a plurality of communication nodes connected in a physical loop form by two transmission means having opposite cell transmission directions relative to each other, each of said two transmission means has a logical start point and an end point;

first storage means disposed in each communication node to store information identifying said each communication node connected by said transmission means;

second storage means disposed in said each communication node to store information identifying a communication node functioning as a logical start point of a physical loop; and direction selecting means disposed in said each communication node to select a cell transmission direction from said opposite cell transmission directions based on information stored in said first and second storage means.

10. An ATM communication system according to claim 9, wherein said information identifying said each communication node stored in said first storage means includes information indicating a mounting position of said each communication node on the loop.

11. An ATM communication system according to claim 9, wherein said information identifying said communication node functioning as a logical start point of a physical loop stored in second storage means includes information indicating a mounting position of said communication node functioning as a slot generator indicating a logical start point.

12. An ATM communication system according to claim 9, wherein among said communication nodes a plurality of communication nodes having a redundant configuration are disposed adjacent to each other, and each of said first and second storage means comprises a memory for storing the same information, and means responsive to occurrence of a fault in one of said communication nodes having the redundant configuration for changing a logical start point of the loop to such a position as to disconnect a faulty communication node from the loop and for simultaneously altering information stored in said second storage means.

13. An ATM communication system according to claim 9, wherein each communication node further comprises means for providing a cell with information indicating a plurality of destination communication nodes.

14. An ATM communication system comprising:

a plurality of communication nodes connected in a physical loop form by two transmission means having opposite cell transmission directions relative to each other, each of said two transmission means has a logical start point and an end point;

buffer means disposed in each communication node to transmit and receive a cell, said buffer means being connected to said two transmission means;

synchronizing pulse generating means connected to said each communication node to generate a timing pulse of reading out a cell from said buffer means;

cell multiplexing means disposed in said each communication node to multiplex a cell to said two transmission means, said cell multiplexing means having an input port and an output port which is connected to said two transmission means;

cell transmitting means disposed in said each communication node to transmit a cell from an input line to said cell multiplexing means, said cell transmitting means being connected to said cell multiplexing means;

cell receiving means disposed in said each communication node to receive a cell from said two transmission means and to supply said cell to an output line, said cell receiving means being connected to said cell multiplexing means at said input port;

first storage means disposed in said each communication node to store information identifying said each communication node connected by said two transmission means;

second storage means disposed in said each communication node to store information identifying a communication node functioning as a logical start point of a physical loop; and direction selecting means disposed in said each communication node to select a cell transmission direction from said opposite cell transmission directions based on information stored in said first and second storage means.

15. An ATM communication system according to claim 14, wherein said information identifying said each communication node stored in said first storage means includes information indicating said each communication node on the loop.

16. An ATM communication system according to claim 14, wherein said information identifying a communication node functioning as a logical start point of a physical loop stored in said second storage means includes information indicating a mounting position of said communication node functioning as a slot generator indicating a logical start point.

17. An ATM communication system according to claim 14, wherein among said communication nodes a plurality of communications nodes having a redundant configurations are disposed adjacent to each other, and each of said first and second storage means comprises a memory for storing the same information, and means responsive to occurrence of a fault in one of said communication nodes having the redundant configuration for changing a logical start point of the loop such a position as to disconnect faulty communication node from the loop and for simultaneously altering information stored in said second storage means.

18. An ATM communication system according to claim 14, wherein each communications node further comprises means for providing a cell with information indicating a plurality of destination communication nodes.

* * * * *